F. D. BROWN.
AUTOMOBILE JACK.
APPLICATION FILED NOV. 13, 1919.
1,365,888.
Patented Jan. 18, 1921.
2 SHEETS—SHEET 2.
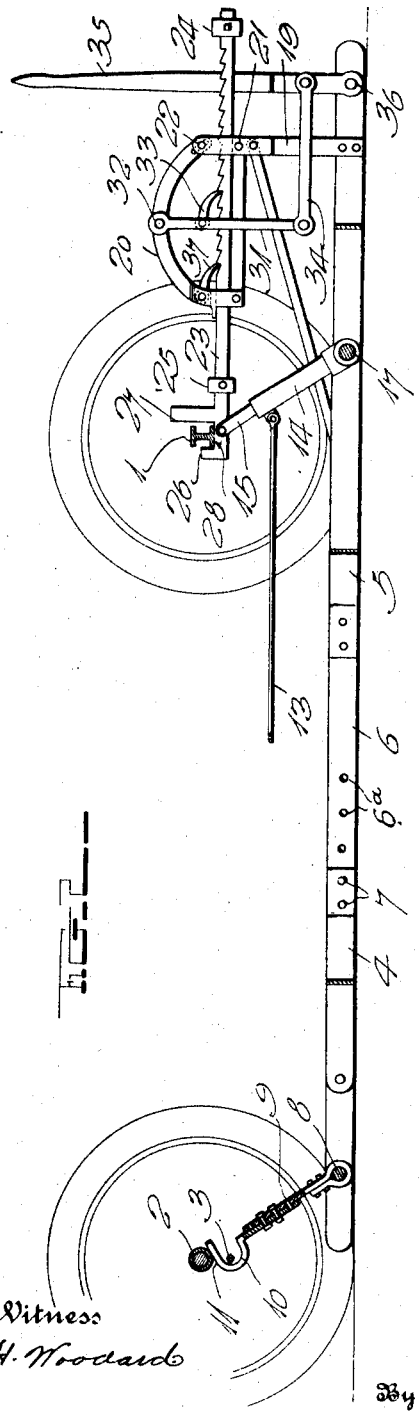
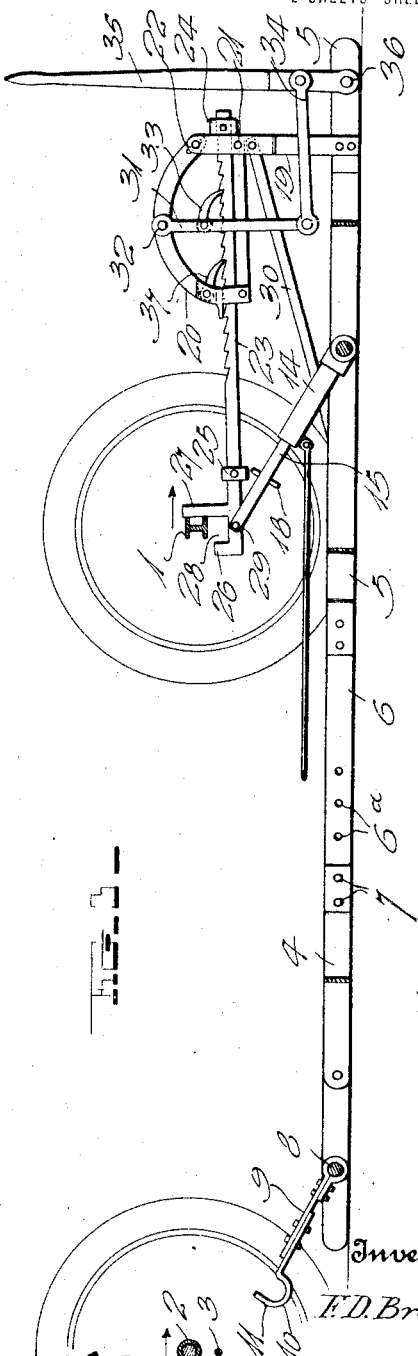
Witness
H. Woodard
Inventor
F. D. Brown
By H. B. Wilson & Co.
Attorneys

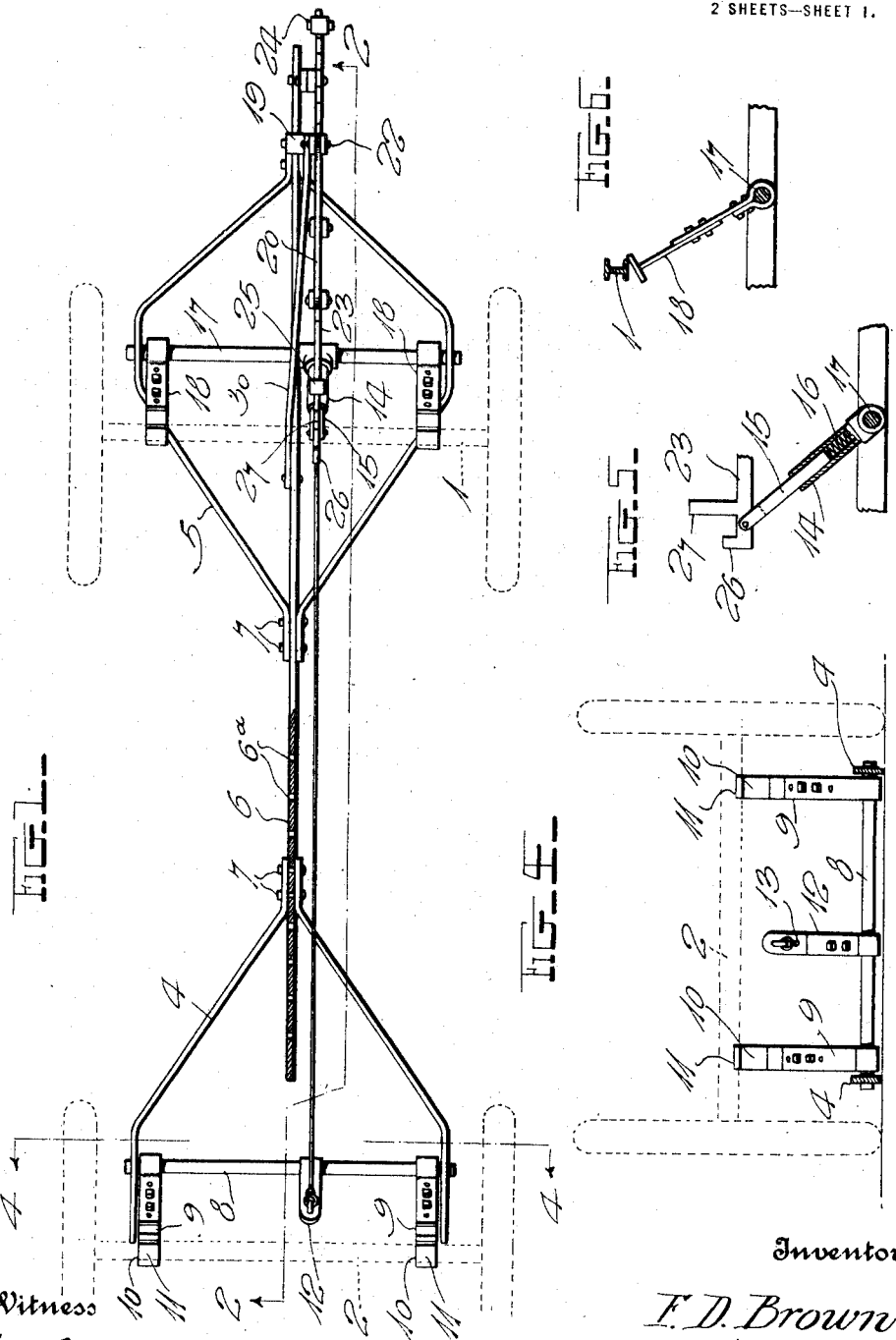

UNITED STATES PATENT OFFICE.

FRANK D. BROWN, OF SUGARGROVE, PENNSYLVANIA, ASSIGNOR OF ONE-HALF TO JAMES A. McINTOSH, OF SUGARGROVE, PENNSYLVANIA.

AUTOMOBILE-JACK.

1,365,888.     Specification of Letters Patent.     Patented Jan. 18, 1921.

Application filed November 13, 1919. Serial No. 337,751.

*To all whom it may concern:*

Be it known that I, FRANK D. BROWN, a citizen of the United States, residing at Sugargrove, in the county of Warren and State of Pennsylvania, have invented certain new and useful Improvements in Automobile-Jacks; and I do declare the following to be a full, clear, and exact description of the invention, such as will enable others skilled in the art to which it appertains to make and use the same.

This invention relates to automobile jacks.

One object of the invention is to generally improve upon devices of this character by providing a structure that is comparatively simple, light, strong, durable and convenient, and which can be manufactured at a comparatively low cost.

Other objects and advantages may become apparent to persons who read the following details of description with the accompanying drawings, in which, Figure 1 is a top plan view of my improved jack, the axles and wheels of an automobile being illustrated in dotted lines.

Fig. 2 is a longitudinal vertical sectional view substantially along the line 2—2 of Fig. 1, the axle-engaging bar being shown in the proper engagement with an axle or pulling the same onto the axle-supporting arms of the front pair.

Fig. 3 is a view similar to Fig. 1, but the axle-engaging bar having its higher shoulder in the path of an automobile's front axle, preparatory to being raised in the position shown in Fig. 2.

Fig. 4 is a transverse sectional view, the section being taken substantially along the line 4—4 of Fig. 1.

Fig. 5 is a sectional detail view illustrating the spring which extends the extensible arm.

Fig. 6 is a detail view illustrating one of the supporting arms in the position it assumes immediately prior to having the front axle of the automobile disposed thereon.

Referring to these drawings in detail in which similar reference characters correspond with similar parts throughout the several views and in which the front and rear axles 1 and 2 and the truss-rod 3 are shown merely to illustrate the relation of my device thereto:—

The device comprises a base frame or main frame which is formed principally of bars of iron or other suitable material, these bars being shaped and assembled to form a rear section 4, a front section 5, and a reach or adjusting bar 6. This bar is formed with apertures 6ª through which bolts 7 extend, these bolts being extended through apertured front ends of two bearing-bars which have their rear ends spaced from one another, and supporting a rocking shaft 8. The rocking shaft 8 has its main or intermediate portion between the rear ends of the bars which form the rear section, and a pair of supporting arms 9 are fixed on the portions of the shaft 8 adjacent to the journal of the shaft. These arms are adjustable, as clearly shown in Fig. 2, the same being formed of two sections which are apertured for the reception of several bolts and these bolts may be interchanged in the apertures when either arm 9 is extended or reduced in its length. The free ends of each arm is formed with a bight 10 which extends laterally of the arm, and an axle-seat extends from this bight 10 laterally of the arm 9 toward and beyond the opposite side of the arm from its bight portion. It will be seen, therefore, that when the automobile is properly positioned over the jack the arms 9 may be swung up into the position shown in Fig. 2, so that axle 2 may rest upon the axle-seat while the truss-rod 3 is undisturbed and is protected by the bight 10.

An arm 12 is fixed on the intermediate portion of the shaft 8 and a link or rod 13 connects this arm with the socket portion 14 of an extensible arm which has its outer end 15 slidable in the socket portion and movable outward by means of a spring 16. The socket portion 14 is fixed on a shaft 17 which has a pair of supporting arms 18 also fixed thereon. These arms 18 are longitudinally adjustable in the same manner as described for the arms 9, and by adjusting the arms 9 and 18 compensation may be made for different heights of axles 1 and 2.

The shaft 17 is journaled in the front section 5 and this section of the basal frame is formed of two bars having their front and rear ends apertured and having bolts extending through these apertures to secure the sides of this frame section in proper relation to one another. The reach 6 is embraced between the front and rear ends of the bars of the section 5, and the same bolts 7 which secure the elements of the frame sections together also secure the reach 5 between these front and rear end portions. The front end of the reach 6 extends forward of the front frame section 6, and a standard 19 is fixed thereto and extends upward therefrom. A guide or movable frame 20 is pivoted at 21 to the standard 19 and joined to the top of the latter by means of pin-and-slot connection 22. This connection of the frame 20 with the standard 19 permits a limited pivotal movement thereof, and an axle-engaging bar 23 is mounted to slide longitudinally through this pivotally mounted frame or guide, stops 24 and 25 being provided on this bar to limit its longitudinal movement. The bar 23 is provided with spaced shoulders or uprights 26 and 27, the latter being considerably longer or higher than the former for standing in the path of movement of an automobile's front axle preliminary to seating the front axle in a recess 28 between the shoulders 26 and 27. The outwardly movable section 15 of the extensible arm is pivotally connected at 29 to a portion of the bar 23 below the recess or space 28, and therefore, when the axle 1 is seated in this recess it is alined with the extensible arm.

A brace or strut 30 is connected to the reach 6 and to the standard 19. A lever 31 is pivotally connected at 32 to the guiding frame 20, and a pawl 33 is carried by the lever 31. The lower end of this lever is pivotally connected to a link 34, and this link is pivotally connected to a hand-lever 35, the latter being pivotally connected at 36 to the forwardly extending portion of the reach 6.

From the foregoing description, it will be seen that the device may be operated as follows:

Assuming that the automobile axles 1 and 2 are moving in the direction of the arrows in Fig. 3, and that the front axle has just begun to press against the higher shoulder 27 having passed over the lower shoulder 26; it will be seen that the bar 23 will be moved longitudinally forward, and that the spring 16 will be compressed within the socket 14. The reaction of this spring, however, presses the rear end of the bar 23 upward so that the axle 1 is substantially alined with the supporting arms 18. In this connection it should be understood that while moving the rear end of the bar 23 upward, the extensible arm also has its rear end moved upward and forward, and this movement of the extensible arm not only swings the arms 18 upward and forward, but also swings the arm 9 upward and forward by means of the link 13, arm 12 and shaft 8. When the supporting arms 18 and 9 are moved forward past their pivotal connections with the basal frame, they are arrested by the rear stop 25 coming into contact with the frame 20.

The bar 23 is provided with teeth with which the dog 33 engages, so that the device may be operated for lifting an automobile which is at rest. This operation is effected by sliding the device rearward under the automobile so that the shoulder 27 presses against the axle 1. This pressure obviously effects the same result as if the axle 1 were pressing forward against the shoulder 27 as described in the foregoing. However, instead of the supporting arms 9 and 18 being brought to the supporting position by the forward movement of the automobile, under its own power, the lever 35 is now brought into action by pulling its handle portion forward so that the dog 33 pulls the bar 23 forward. Having pulled the bar 23 a distance equal to the pitch distance of its teeth a holding dog 37 takes effect to retain the bar 23, while the dog 33 is returned to engage with another tooth. By thus moving the dog 33 back and forth it will be seen that the bar 23 will be gradually drawn forward so as to bring the supporting arms forward with the automobile supported thereon. Moreover, because of the combination of levers, links and coöperative adjuncts shown and described it will be seen that I provide a very effective leverage in a very compact and convenient arrangement whereby a single person can easily lift the automobile.

Although I have described this embodiment of my invention very specifically it is not intended to limit this invention to these exact details of construction and arrangement, but changes may be made within the scope of the inventive idea as described and claimed.

What I claim as my invention is:

1. In an automobile jack, a basal frame, a rocking shaft pivotally connected to said frame, an axle-supporting arm fixed to said rocking shaft, an extensible arm fixed to said shaft, a spring to extend said extensible arm, a longitudinally movable axle-engaging bar disposed substantially horizontally and pivotally connected to said extensible arm, and means to move said axle-engaging bar longitudinally and thereby coact with the extensible arm for disposing an automobile's axle upon said axle-supporting arm.

2. In an automobile jack, a base frame formed mainly of flat bars of metal and comprising a front section, a rear section and a reach or coupling section, said rear section comprising two bearing bars having apertured front ends and bolts through these apertures, said reach being secured between said front ends by means of said bolts, said front section being formed of two bearing bars having apertured front and rear ends which have bolts therethrough, the intermediate parts of said bars being bent outward from one another to provide a space between the bearings thereof, said reach being secured between said front and rear ends of the front section and extending forward beyond the latter, a rear rocking shaft journaled in said rear section, a front rocking shaft journaled in the spaced bearings of said front section, axle-engaging supports on said rocking shafts, an actuating lever pivoted on the forward extension of said reach, and means operable by said actuating lever to swing said axle-engaging supports about the axes of their rocking shafts.

3. In an automobile jack, a basal frame, a shaft journaled thereon, an automobile-supporting arm fixed to said shaft, an extensible arm fixed to said shaft, a bar pivotally connected to said extensible arm and being formed with spaced shoulders, the space between said shoulders being above the pivot that connects the said bar with said extensible arm and being adapted to receive an automobile-axle therein, a standard secured to said frame, a guide pivoted on said standard and having said bar mounted to slide longitudinally therein, a lever pivoted to said guide, and a pawl carried by said lever and engageable with said bar to move it longitudinally.

In testimony whereof I have hereunto set my hand.

FRANK D. BROWN.